July 28, 1959  G. L. OLSON  2,896,430
FLEXIBLE COUPLING CONSTRUCTION
Filed March 10, 1958  2 Sheets-Sheet 1

INVENTOR.
Gordon L. Olson
BY
Munroe W. Hamilton
ATTORNEY

July 28, 1959     G. L. OLSON     2,896,430
FLEXIBLE COUPLING CONSTRUCTION
Filed March 10, 1958     2 Sheets-Sheet 2

INVENTOR.
BY *Gordon L. Olson*
ATTORNEY

United States Patent Office 2,896,430
Patented July 28, 1959

2,896,430
FLEXIBLE COUPLING CONSTRUCTION
Gordon L. Olson, Arlington, Mass.
Application March 10, 1958, Serial No. 720,331
6 Claims. (Cl. 64—7)

This invention relates to a universal joint for coupling rotatable bodies and, more particularly, the invention is concerned with a novel joint mechanism for coupling driver and driven shaft components particularly where these parts may occur in angular or off-set misalignment.

It is a principal object of the invention to provide an improved universal joint construction which includes an organization of coupling components arranged in unique balanced relationship to provide for transmission of rotary driving forces over a wide range of rotary driving speeds without chatter wear or backlash regardless of shaft misalignment of either angular or off-set character.

Another object of the invention is to provide a flexible coupling which has adaptability in many different applications such as coupling shafts and various other universal joint applications. Still another object of the invention is to devise a combination of unique coupling components which can be simply and accurately produced and assembled on a production basis and which can nevertheless be manufactured in a wide range of sizes.

The nature of the invention and its objects and novel features will be more fully understood and appreciated from the following description of preferred embodiments of the invention selected for purposes of illustration and shown in the accompanying drawings in which.

Figure 1:
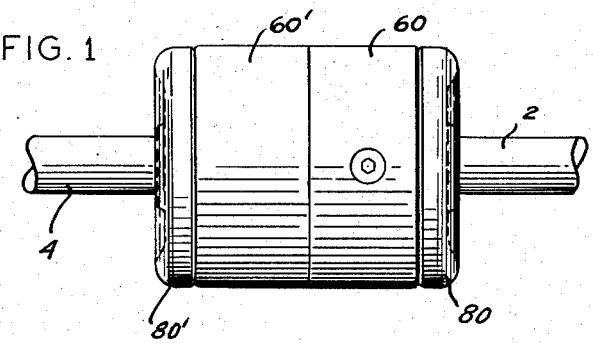
Fig. 1 is a view in side elevation illustrating the coupling device of the invention connecting together two shaft elements.
Figure 2:
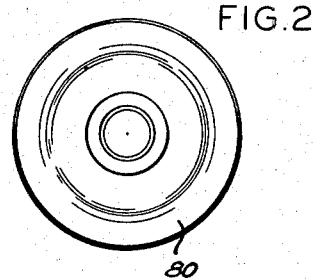
Fig. 2 is an end elevational view of the coupling structure shown in Fig. 1.

Referring more in detail to the structure shown in the drawings, numerals 2 and 4 denote two rotatable bodies which may, for example, consist of a driver shaft and driven shaft and which are intended to be illustrative generally of various rotatable bodies which may be desired to be coupled together and wherein a universal joint is required for translating rotative driving forces.

Figure 3:
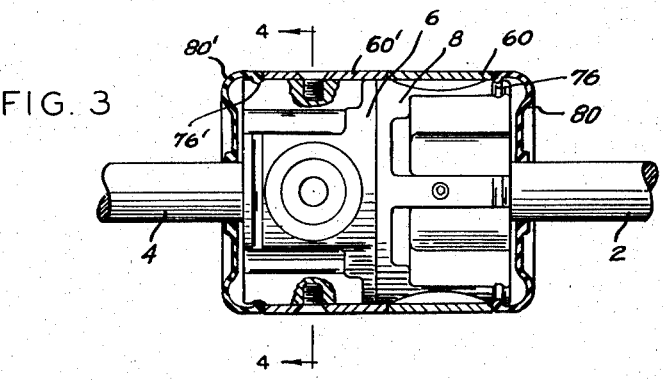
Fig. 3 is a view in cross-section illustrating more in detail components of the coupling structure.

The universal joint mechanism of the invention is particularly illustrated in coupled relationship with respect to shafts 2 and 4 in Figs. 1 and 3, and as shown therein, may include a main tubular body preferably comprised by two casing sections 6 and 8, as noted in Fig. 3. These casing sections are formed with cylindrical bores and are open at either end to receive therein extremities of shafts as suggested in Fig. 5 by the shaft 4.

Figure 6:
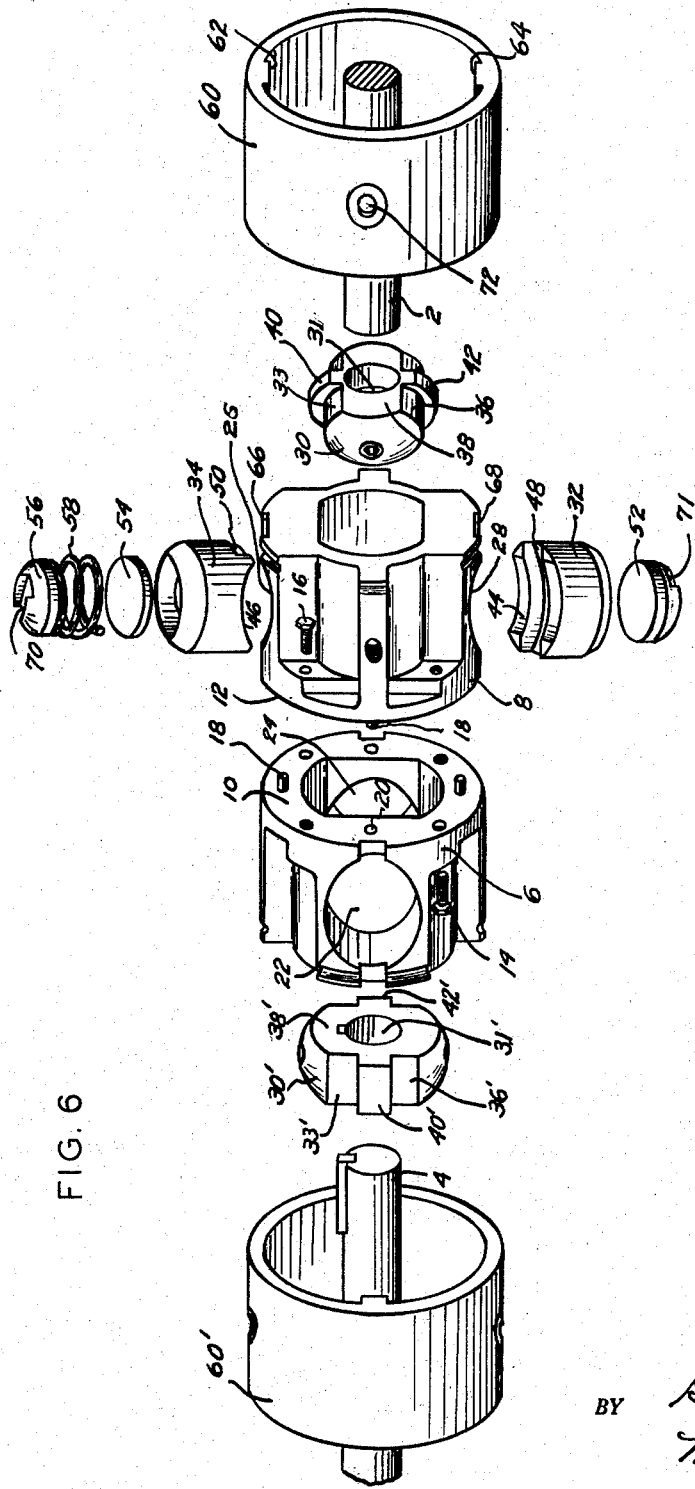
Fig. 6 is an exploded view showing in perspective the several coupling components removed from one another.

In Fig. 6 the casing sections 6 and 8 are shown separated from one another and it will be observed from an inspection of the figure that the sections have smooth abutting surfaces 10 and 12 which may be secured together by suitable fastenings as 14 and 16. It may also be desired to provide for a limited axial displacement by means of interlocking pins and slots as indicated by numerals 18 and 20, respectively.

In accordance with the invention, I form the casing sections with bearing apertures in which are mounted special mechanisms which I have devised. The bearing apertures extend transversely through opposite side wall portions of the casing sections. One set of bearing apertures in casing section 6 is indicated in Fig. 6 by numerals 22 and 24. A second set of bearing apertures is indicated by numerals 26 and 28 in casing section 8 and, it will be observed that the apertures 26 and 28 occur substantially at ninety degrees rotation with respect to the apertures 22 and 24 of section 6.

Figure 4:
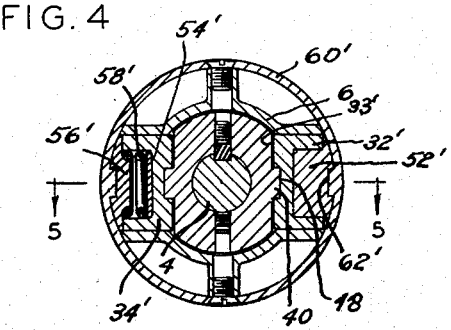
Fig. 4 is a cross-section taken on the line 4—4 of Fig. 3.
Figure 5:
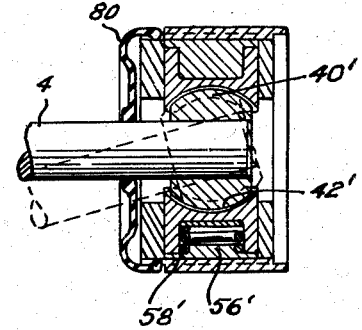
Fig. 5 is a cross-section taken on the line 5—5 of Fig. 4.

The special joint mechanism which I have devised is adapted to be supported in these bearing apertures in the manner generally indicated in Figs. 3, 4 and 5, and includes two separate units. Each unit consists of a central joint component and a pair of cylindrical pivot elements arranged at either side of the joint element and slidably disposed in the bearing apertures above described.

These parts are more clearly shown in Fig. 6 wherein numeral 30 denotes a joint component and numerals 32 and 34 indicate pivot elements of one unit. A second unit is indicated by a joint component 30' having pivot elements 32' and 34' as shown in Fig. 4. Apertures 22 and 24 indicated for receiving these pivot elements appear in Fig. 4.

The joint components 30 and 30' are of similar construction and, as shown in Fig. 6, comprise elongated body portions through which are formed centrally located openings 31 and 31' in which may be slidably received and keyed shafts 4 and 2. An important feature of these joint components are opposed cylindrical thrust surfaces 33, 36, 33' and 36' which are preferably constructed as quadrants of a right cylinder as a result of being cut away on the opposite sides to leave flat faces as 38, 38'. Each of the cylindrical quadrants is further constructed with centrally located arcuate guide ribs as 40, 42, 40', 42'.

The cylindrical thrust surfaces 33, 36, 33', 36' are pivotally supported in cylindrical mating surfaces as, for example, surfaces 44 and 46 formed in the respective pivot elements 32 and 34. Similarly, the guide ribs 40 and 42 are slidably contained in slots as 48 and 48' formed in respective pivot elements.

The joint components 30 and 30' have their maximum dimension of a magnitude which is slightly less than the diameter of the openings through the casing sections which allows the joint components to be inserted through the openings. For example, the joint element 30 is inserted in the casing section 8 and thereafter the cylindrical pivot elements 32 and 34 may be passed through the apertures 26 and 28 and brought into engagement with respective cylindrical thrust surfaces of the joint component 30.

A disc 52 formed with a rounded top surface and a flat disc 54 are fitted into respective apertures 28 and 26. A coiled spring 58 is seated against the flat disc 54 and a retaining disc 56 is disposed against the upper side of the coiled spring 58. The disc 56 is also formed with a rounded top section corresponding to that of disc 52. These parts comprise a pivoted mounting for joint component 30 and when assembled as described may be locked together by means of a cylindrical retaining sleeve 60. This sleeve 60 is fitted on over the casing part 8 and is further provided with key portions 62 and 64 which are designed to engage through slots as 66 and 68 in the casing part 8. The key portions 62 and 64 are also received through the rounded top portions of respective discs 56 and 52 in slots 70 and 71.

By means of the arrangement described, the sleeve is prevented from rotative movement with respect to the casing section 8. The rounded top portions of the discs 56 and 52 when engaged by the cylindrical surface of the sleeve 60 is mounted against rotative displacements and this is further strengthened by the location of the key portions 62 and 64 through the slots 70 and 71. If desired, the sleeve may also be secured by a screw fastening located through the threaded openings 72 and 74. Similarly, the retaining sleeve 60' is employed to lock together the joint component 30' and its pivot elements in the casing section 6. It should be observed, however, that the cylindrical quadrants of a component in one casing section occurs at ninety degrees with respect to the cylindrical quadrants of a component in the other casing section.

I may also desire to form the retaining sleeves 60 and 60' with annularly recessed portions as 76 and 78 around which are fitted elastic sealing rings as 80, 80'. These sealing rings are adapted to fit tightly around the shafts 2 and 4 to exclude dirt, moisture and the like.

Considering in detail the operation of the joint construction when in the fully assembled position shown in Figs. 1-5, inclusive, it will be seen that a rotative force exerted on the shaft 2, for example, will act through the joint component 30 to which the shaft is keyed or otherwise fastened. The cylindrical thrust surfaces 33 and 36 transmit the rotary driving forces to the pivot elements 34 and 32 respectively and turn the casing section 8. Casing 8 drives the casing section 6 together with its pivots 32' and 34' and joint component 30', and shaft 4. Since the joint components and their respective pivot elements are pivotally received in the bearing apertures of the casing sections, the units may swivel independently of one another to compensate for any angular or off-set misalignment.

Considering these movements in more detail, attention is directed to Figs. 3, 4 and 5. As noted in Fig. 4 I have shown disc components corresponding to the disc components 52, 54 and 56. However, the second set of disc components are denoted by primed numerals, namely, 52', 54' and 56'. As shown in Fig. 4 the part 52' is held against the cylindrical surface of the sleeve 60 in addition to being keyed so that it cannot turn in any direction, even a slight degree. The thrust against the pivots is transferred from the quadrant surfaces as 33 and 36 to the adjacent surfaces of the pivots which provide an arc of rotation in a circle. The opposite pivot element being spring loaded can yield slightly. The pivot which is opposite from the spring loaded side thus provides a positive centering for each of the joint components and the central axis of the joint component cannot get out of balance by reason of the cooperative action of the two pivot units. On the spring loaded pivot unit the thrust of the joint is taken up slightly in the disc 54 and spring 58 which are in turn backed up by the keyed disc portion 56'. The unit is set with a definite pre-loading condition and this pre-loaded condition can be kept constant for the life of the coupling and backlash is substantially eliminated.

It will be observed that each joint component is limited to movement through an arc of rotation which lies in a plane passing through the axis of the shaft portion engaged. It is also pointed out that the joint component and the pivots move as a unit in arcs of rotation, any of which occurs at right angles to the arc of rotation of the joint component in its supporting pivots.

Thus both types of movement are constantly guided by two different sets of arcuate bearing surfaces and, as a result, backlash and wear can, to a large extent, be eliminated. Moreover the cylindrical thrust surfaces of each joint component are organized in opposed quadrants to provide four areas which can transmit forces with the peculiar balanced relationship of parts inherent in a square configuration. As a result, high speed driving stresses can be equalized and absorbed without chatter and at the same time angular or off-set misalignment may be handled with the spring loading of the pivot elements taking up wear.

While I have shown a preferred embodiment of the invention, it will be understood that various changes and modifications may be resorted to within the scope of the appended claims.

Having thus described my invention, what I claim is:

1. A universal joint construction for coupling rotatable bodies comprising a tubular casing, a universal joint mechanism mounted in the tubular casing in a position to engage with the rotatable bodies therewithin, said universal joint mechanism including joint components presenting opposed cylindrical surfaces, pivot means formed with respective mating surfaces, said mating surfaces supporting the opposed cylindrical surfaces for rotative movement through an arc of rotation which lies in a plane passing through the longitudinal axis of that rotatable body on which a respective joint component is engaged, said pivot means consisting of pivot elements slidably disposed through opposite side wall portions of the tubular casing, and retaining sleeve means located externally of the tubular casing for confining the pivot elements in swivelling relationship in said side wall portions of the casing whereby a ball joint component and respective supporting pivot elements may move as a unit through an arc of rotation which lies in a plane at right angles to an arc of rotation of a respective longitudinal surface of the unit.

2. A universal joint construction for coupling rotatable bodies comprising a tubular casing, a universal joint mechanism mounted in the tubular casing in a position to engage with the rotatable bodies therewithin, said universal joint mechanism including joint components presenting opposed cylindrical surfaces, pivot means formed with respective mating surfaces said mating surfaces supporting the opposed cylindrical surfaces for rotative movement through an arc of rotation which lies in a plane passing through the longitudinal axis of that rotatable body on which a respective joint component is engaged, said cylindrical surfaces of the joint components including centering guide rib portions and said pivot mating surfaces are slotted to receive said guide rib portions.

3. A universal joint construction for coupling rotatable bodies comprising a tubular casing, a universal joint mechanism mounted in the tubular casing in a position to engage with the rotatable bodies therewithin, said universal joint mechanism including joint components presenting opposed cylindrical surfaces, pivot means formed with respective mating surfaces, said mating surfaces supporting the opposed cylindrical surfaces for rotative movement through an arc of rotation which lies in a plane passing through the longitudinal axis of that rotatable body on which a respective joint component is engaged, said tubular casing being constructed in two sections, said sections presenting abutting surfaces which include pin means for slight axial displacement during rotative movement of the two sections.

4. A universal joint construction for coupling rotatable bodies comprising a tubular casing, a universal joint mechanism mounted in the tubular casing in a position to engage with the rotatable bodies therewithin, said universal joints mechanism including joint components presenting opposed cylindrical surfaces, pivot means formed with respective mating surfaces, said mating surfaces supporting the opposed cylindrical surfaces for rotative movement through an arc of rotation which lies in a plane passing through the longitudinal axis of that rotatable body on which a respective joint component is engaged, said pivot means consisting of pivot elements loosely disposed through the side wall portions of the tubular casing, a retaining sleeve located externally of the casing and spring means cooperating with the retaining sleeve for yieldably supporting said pivot elements in the casing and means for interlocking the retaining sleeve with the casing.

5. A universal joint construction for coupling rotatable bodies comprising a tubular casing, a universal joint mechanism mounted in the tubular casing in a position to engage with the rotatable bodies therewithin, said universal joint mechanism including joint components presenting opposed cylindrical surfaces, pivot means formed with respective mating surfaces, said mating surfaces supporting the opposed cylindrical surfaces for rotative movement through an arc of rotation which lies in a plane passing through the longitudinal axis of that rotatable body on which a respective joint component is engaged, said pivot means consisting of pivot elements loosely disposed through opposite side wall portions of the tubular casing, disc means overlying said pivot elements in the casing side wall portions, a retaining sleeve located externally of the casing and spring means cooperating with the discs and retaining sleeve to yieldably support the pivot elements in swivelling relationship in the casing.

6. A universal joint construction for coupling rotatable bodies comprising a tubular casing, a universal joint mechanism mounted in the tubular casing in a position to engage with the rotatable bodies therewithin, said universal joint mechanism including joint components presenting opposed cylindrical surfaces, pivot means formed with respective mating surfaces, said mating surfaces supporting the opposed cylindrical surfaces for rotative movement through an arc of rotation which lies in a plane passing through the longitudinal axis of that rotatable body on which a respective joint component is engaged, said opposed cylindrical surfaces being quadrants of a right cylinder.

References Cited in the file of this patent
UNITED STATES PATENTS

| 1,358,467 | Robertson | Nov. 9, 1920 |
| 1,392,754 | Francke | Oct. 4, 1921 |
| 1,582,997 | McGee | May 4, 1926 |
| 1,898,265 | Ragan | Feb. 21, 1933 |